Patented May 6, 1930

1,757,373

UNITED STATES PATENT OFFICE

HEINRICH KRIEGSHEIM, OF NEW YORK, AND WILLIAM VAUGHAN, OF BROOKLYN, NEW YORK, ASSIGNORS TO THE PERMUTIT COMPANY, OF NEW YORK, N. Y., A CORPORATION OF DELAWARE

METHOD OF IMPROVING GLAUCONITE

No Drawing. Application filed May 4, 1925, Serial No. 28,011. Renewed October 23, 1929.

This invention relates to methods of improving glauconite; and it comprises a process of improving glauconite for the purification of water and like purposes, wherein the glauconite is treated with a solution of an alkali, this alkali being usually either caustic soda or carbonate of soda, and is thereafter treated with sulfate of alumina and with silicate of soda in succession; all as more fully hereinafter set forth and as claimed.

Glauconite is a native hydrated double silicate of iron and potassium found in large beds in various Eastern States. While it is regarded as originally of marine origin, it occurs stratified in ordinary clays and sands. It is, as a matter of fact, as dug out, a more or less earthy material; it is what is implied by the usual name of "green sand". The characteristic mineral of green sand is glauconite; but there are always other things present in greater or less amount.

Glauconite has acquired a status in the art of purifying water. While it is different from the artificial zeolites which are largely used, it also has the same property of softening water and it is used in much the same way, viz., by flowing or percolating hard water through a bed of material until its power of taking up lime and magnesia begins to wane and then revivifying with common salt, washing, etc. The properties of glauconite in this respect are like those of the artificial zeolites but not identical, and glauconite has particular advantages in certain special relations, as in treating hot waters and slightly acid waters.

As stated, natural green sand is apt to be rather an impure material. Sometimes, it is found fairly pure, but even so, it requires some purification or other treatment to adapt it for technical purposes, if no more than to screen out fine material. As the green sand occurs, it generally has some odor and it contains some soluble matter; some of this soluble matter being organic and of the nature of what is called "humus". It is desirable to free it of its natural clayey odor and of humus—that is, of organic constituents which are soluble and which may give color or taste to water.

In certain prior and copending applications, we have recited various ways of purifying glauconite to make it better adapted for softening water. In one such application, Serial No. 547,342, filed March 27, 1922, (maturing into Patent No. 1,538,247, of May 19, 1925) we have described a particular process of freeing glauconite of soft and disintegrable matter which may affect its use in softening water. In this process, the glauconite is washed alternately with salt solution and with water; this water being usually soft. Ordinarily, the water is used over and over again and if not soft at first, it becomes so. In so doing, the salt solution affects disintegrable and clayey matters present in such a manner that in the water treatment they can be removed as mud. In this prior application, we contemplated quickening the purifying operation by a preliminary treatment of the glauconite with a somewhat alkaline solution, such as a weak solution of sodium hydroxid (caustic soda). In another copending application, Serial No. 589,276, filed September 19, 1922, we have described a way of hardening and improving glauconite wherein the glauconite is exposed to the successive actions of a solution of sodium silicate and of a solution of aluminum sulfate. Either the sulfate or the silicate could be employed first; the specific claims of the application, however, relating to a process wherein the silicate was first used and then the sulfate. The material treated can be preliminarily purified in the manner described in the other application, Serial No. 547,342. The function of the treatment with weak solutions of silicate and aluminum sulfate is to clean, harden and strengthen the grains and somewhat improve the exchange power. The glauconite granules remain as such and are not otherwise changed.

The present invention relates to a specific method of treatment wherein the glauconite is treated first with a weak solution of an alkali to free it of odor and humus constituents, and is then treated with a solution of aluminum sulfate and with a solution of sodium silicate; the sulfate being first used and then the silicate. Operating in this way is here advantageous, since the aluminum sulfate, which is an acid reacting body, in addition to its other functions, serves to neutralize the alkalinity of the alkali treated glauconite. In the present invention, which is dealing more particularly with soft and impure glauconites having odor or taste, we find it expedient to have the alkali treatment succeeded by the acid treatment. In practice, we do not wash or rinse between treatments. Instead of aluminum sulfate in the second stage of the operation, we may employ other acid-reacting bodies or weak acids or weak solutions of acids.

In the initial treatment of the glauconite with alkali, it is desirable that the alkalinity of the solution used be not too high. Caustic alkali solutions have somewhat of a disintegrating effect on glauconite, if the concentration be too great or the temperature be too high. Caustic soda is however extremely efficient in removing taste and odor even in relatively weak and cold solutions and is rapid in its action. Carbonate of soda has less disintegrating effect with like concentrations and temperatures but is also somewhat less active in removing taste and odor. By the expedient of dissolving some silica in the caustic alkali solution or, which is the same thing, admixing with it some silicate of soda, the disintegrating tendency is checked without impairing the activity in the other respect, making it possible to use stronger and warmer solutions and quicken the operation. However, since it is a certain type of alkalinity that is wanted, the amount of silica should not be too high. The presence of a small amount of a combination of soda with a weak acid, such as silicic acid or carbonic acid, diminishes the alkalinity and the disintegrating powder of soda. We find that in practice it is best not to have the proportion of silica ($SiO_2$) to soda ($Na_2O$) greater than equimolecular; that is, the ratio of $SiO_2$ to $Na_2O$ should not be greater than 1:1; and it may be considerably less. Alkaline solutions of this type suitable for our purpose may be readily prepared by mixing commercial waterglass, which has an extremely high silica ratio, with caustic soda or sodium carbonate. Instead of using sodium silicate, sodium aluminate may be employed. Borax is another alkaline body which may be used, either alone or in admixture with sodium hydroxid (caustic soda) or sodium carbonate (soda ash). Instead of using soda and sodium compounds, potash and potassium compounds may be employed; but these offer no special advantages and are more expensive. In using soda and sodium compounds on glauconite, some potash goes into solution and this may be recovered from washing liquids; if desired, by the use of lime zeolites. Hydrated Portland cement can also be used for abstracting potash from these solutions, giving a material well adapted for use as a fertilizer.

Glauconite which in its natural state imparts odor and color to water, if treated by the present process, does neither; and it is also hardened and its exchange power is improved somewhat.

Green sand as it comes varies somewhat in its power of withstanding the action of caustic soda solutions. Some green sand disintegrates with solutions of caustic soda of strengths, and at temperatures, having no effect on other samples. But, as a general rule, even a dirty glauconite we find will withstand a hot caustic soda solution of 1° Baumé (0.5 per cent NaOH) for half-an-hour or so, which is ample time for our purposes; and particularly if the alkali treatment is at once followed by a treatment with sulfate of alumina or another acid material. Some glauconites will withstand considerably stronger solutions of caustic soda, even up to 4° or 5° Baumé. In a general way, the weaker the solutions, the greater the heat that can be employed, and vice versa. Carbonate of soda, as stated, has less disintegrating effect and can be used in greater concentrations. However, for our purpose of removing odor and taste, a 1° Baumé solution of ordinary soda ash used at a temperature of 60° or 70° C. is sufficiently strong. To some extent, the amount and strength of alkali to be used depends upon the proportion of impurity present. The impurities take up a certain amount of the alkali.

In a specific embodiment of our invention, treating a glauconite containing considerable humus and imparting both color and odor to water, we treat the glauconite for half-an-hour with a 1° Baumé solution of caustic soda at a temperature of 50° C., using enough to cover the material. Such a solution contains about 4 grams $Na_2O$ per liter, or 0.4 per cent, and may contain a little added waterglass. The amount, however, should not ordinarily be more than will give 4 grams $SiO_2$ per liter and may be, and usually is, less. Some addition of waterglass is particularly desirable with this particular glauconite which has some tendency to disintegrate. In this instance, we used silicate of soda in amount sufficient to give two grams $SiO_2$ per liter. In this treatment of the glauconite, a considerable amount of alkalinity disappears, as shown by titration tests. Without rinsing or washing, we next expose the glauconite to the action of a 1° Baumé solution of commercial aluminum sulfate; that is, about a 1 per cent solution, calculated on the anhydrous sulfate. This treatment is at the ordinary temperature. Afterwards, the material is treated with a 5° Baumé solution of commercial silicate of soda or waterglass.

The material is then washed and dried. After this treatment, it is free from the constituents giving odor and taste in using the glauconite for softening water. Brown colored solutions are produced during the process, but no further brown color develops in the use of the material for purifying water. The exchange power, that is, the power of softening water, is materially improved as compared with the original material. No disintegration of the material takes place, and, on the other hand, it is somewhat hardened.

In lieu of aluminum sulfate, alum or any other convenient acid-reacting aluminum salt may be employed. Other acid-reacting salts, such as ferric chlorid solution, may be used. Weak solutions of hydrochloric acid or sulfuric acid are also suitable. The weak vegetable acids, such as acetic acid, may be employed.

What we claim is:—

1. In the purification of natural glauconite for water softening purposes, the process which comprises treating such glauconite with a weak solution of caustic soda.

2. In the purification of natural glauconite for water softening purposes, the process which comprises treating such glauconite with a weak solution of caustic soda containing a small proportion of the sodium salt of a weak acid.

3. In the purification of natural glauconite for water softening purposes, the process which comprises treating such glauconite with a weak solution of caustic soda containing some sodium silicate.

4. In the purification of glauconite for water softening purposes, the process which comprises treating glauconite with a weak solution of alkali, this treatment being followed by a treatment with an acid-reacting solution and by a final treatment with a sodium silicate solution.

5. In the purification of glauconite for water softening purposes, the process which comprises treating glauconite with a weak solution of alkali, this treatment being followed by a treatment with a solution of aluminum sulfate and by a final treatment with a sodium silicate solution.

6. In the purification of glauconite for water softening purposes, the process which comprises treating glauconite with a weak solution of alkali containing an alkali metal salt of a weak acid, this treatment being followed by a treatment with a solution of aluminum sulfate and by a final treatment with a sodium silicate solution.

7. In the purification of glauconite for water softening purposes, the process which comprises treating glauconite with a weak solution of alkali containing alkali metal silicate, this treatment being followed by a treatment with a solution of aluminum sulfate and by a final treatment with a sodium silicate solution.

8. In the purification of natural glauconite for water softening purposes, the process which comprises treating such glauconite with a weak solution of an alkali metal hydroxid.

9. The process of preparing a base exchange material for water softening use which comprises treating a natural glauconite with a solution of a caustic alkali to an extent effective to impregnate the glauconite with the caustic material.

10. A water softening material in granular form comprising green-sand impregnated with a caustic alkali.

11. A water softening material in granular form comprising green-sand indurated with caustic alkali.

12. In the improvement of natural glauconite the process which comprises treating such glauconite with a solution of caustic alkali.

13. In the improvement of natural glauconite the process which comprises treating such glauconite with a solution of sodium hydroxid.

In witness whereof we have hereunto affixed our signatures.

HEINRICH KRIEGSHEIM.
WILLIAM VAUGHAN.